March 23, 1926.
W. D. SCHWENK
ELECTRICALLY HEATED STEERING WHEEL
Filed Sept. 29, 1924
1,577,987
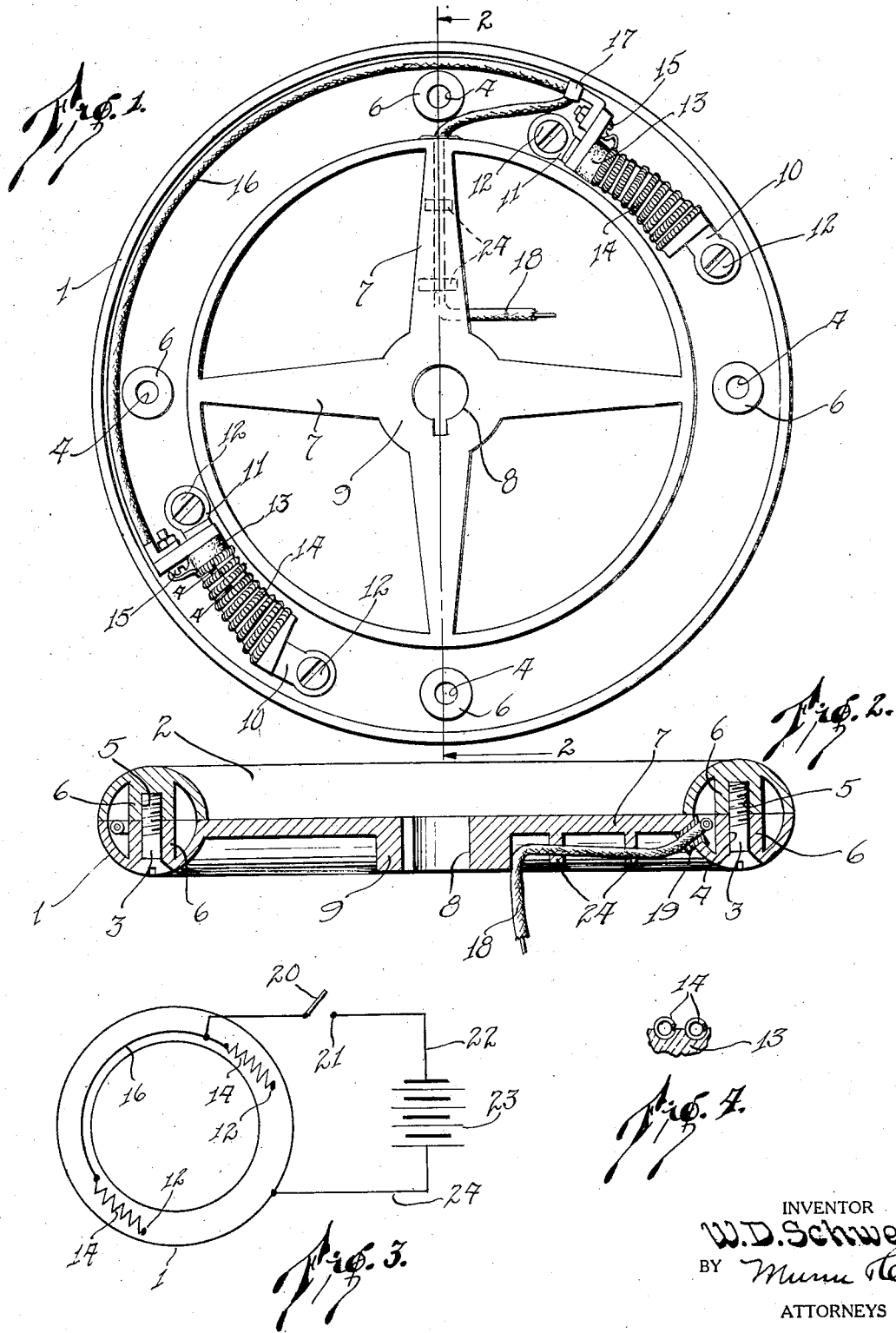

Patented Mar. 23, 1926.

1,577,987

UNITED STATES PATENT OFFICE.

WILLIAM D. SCHWENK, OF FERNDALE, MICHIGAN.

ELECTRICALLY-HEATED STEERING WHEEL.

Application filed September 29, 1924. Serial No. 740,613.

*To all whom it may concern:*

Be it known that I, WILLIAM D. SCHWENK, a citizen of the United States, and a resident of Ferndale, Oakland County, Michigan, have invented a new and useful Improvement in Electrically-Heated Steering Wheels, of which the following is a full, clear, and exact description.

My invention relates to improvements in electrically heated steering wheels, and it consists in the combinations, constructions, and arrangements herein described and claimed.

An object of my invention is to provide an electrically heated steering wheel which is constructed of metal so that heat applied to internal portions of the rim or hand grip may be conducted throughout the entire circumferential portions of the hand grip.

A further object of my invention is to provide a device of the type described in which replacement of the heating elements may be quickly and easily accomplished without the use of special tools or connecting members.

A further object of my invention is to provide an electrically heated steering wheel in which the spider of the wheel is formed as an integral part with one of the separable sections of the rim or hand grip proper, thus greatly reducing the cost of manufacturing the device and increasing the rigidity of the wheel, as well as practically eliminating all possibility of vibration between the spider and the wheel, such as commonly found in the ordinary type of wheel having a spider and wheel portion constructed of separate elements secured together by screws, bolts, or the like.

A further object of my invention is to provide a device of the type described in which the heating elements are distributed at those portions of the wheel over which the hand normally rests when the rim is manipulated.

Other objects and advantages will appear in the following specification, and the novel features of the invention will be particularly pointed out in the appended claim.

My invention is illustrated in the accompanying drawings, forming part of this application, in which—

Figure 1 is a top plan view of an embodiment of my invention with the upper portion of the rim or hand grip removed, Figure 2 is a sectional view along the line 2—2 of Figure 1, Figure 3 is a diagrammatic view showing the electrical circuit employed in the invention, and Figure 4 is a sectional view along the line 4—4 of Figure 1.

In carrying out my invention I make use of a hollow annular rim or hand grip consisting of a lower portion 1 and an upper portion 2 secured to one another by the provision of machine screws 3 projected through the openings 4 in the lower wall of the member 1 and received in threaded sockets 5 on the inner wall of the member 2. The openings 4 and the threaded sockets 5 are provided in bossed portions 6 of the members 1 and 2 respectively so as to increase the depth of the opening and the sockets respectively.

The spider 7 is cast integral with the member 1 and has a central opening 8 through the hub 9 thereof for securing the wheel upon the steering column of a motor vehicle.

Both the members 1 and 2 of the rim or hand grip are formed of metal castings finished to present a smooth surface which the hand may grip with comfort when driving.

A pair of removable heating elements, each having supporting lugs 10 and 11 at the opposite ends thereof are supported at the hollow rim or hand grip by the provision of screws 12 projected through the lugs 10 and 11 and into the lower wall of the member 1. These elements are at diametrically opposite portions of the rim and at substantially the places where the driver normally holds the rim while driving.

The elements each have an insulating core 13 upon which is wound spiral heating wire 14, one terminal of which is connected with a binding screw 15, supported at that end of the core adjacent to the lug 11, but insulated from the lug 11. A conducting wire 16 is employed for connecting the binding screws 15 to one another.

Connecting wire 16 is in turn connected at 17 with a lead wire 18 which is passed through an insulating bushing 19 projected through the side wall of the member 1. Lead wire 18 is connected to a switch blade 20, (see Figure 3). A contact member 21 arranged for engagement with the blade 20 when the blade 20 is closed, is connected by means of a conductor 22 to one terminal of a battery 23. The opposite terminal of the battery 23 is grounded, and therefore connected with the metal member 1 of the rim. In Figure 3, 24 represents the ground connection, which of course includes all of the contact metal parts of the vehicle frame, spring column, etc. In this manner, the lugs 10 are connected with the ground terminal of the battery 23, and when the switch blade 20 is closed, current is free to flow through the heating coils on the cores 13, and thus produce heat which is confined to the hollow rim, and conducted through the side walls of the rim to the surface throughout the entire circumferential portion of the rim. In this manner the person holding the wheel need not suffer from numb fingers or hands which in the present type of steering wheel is a constant annoyance in severely cold weather.

A pair of depending lugs 24 is provided on the under surface of one arm of the spiders 7. These lugs have openings therethrough, through which the connecting wire 18 is conducted so as to prevent the wire from dropping down upon the control quadrants, normally disposed beneath the spider of the wheel on the steering column.

From the foregoing description of the various parts of the device, the operation thereof is readily understood. Let us assume that it is necessary to install one of the heating elements for use. To this end the mechanic would remove the screws 3, thus permitting the upper member 2 of the wheel or hand grip to be removed so that access to the heating elements is obtained. It is then a simple matter to loosen the binding screws 15 and to withdraw the screws 12 projected through the lugs 10 and 11 so that the entire element may be removed and a new element substituted in its place.

Upon reassembly of the rim, the device is ready for use.

When the switch blade 20 is actuated to engage with the contact member 21, current from the battery 23 will flow through the switch through the lead wire 18 where it will branch on the connecting link 16 and flow through each of the heating coils on the cores 13. The flow of current will turn to the opposite pole of the battery 23, through the metal portion 1, to the spider 7, the steering column of the vehicle, and through other ground metal to the battery 23.

It will be noted that the heating elements are connected in parallel, so that either will actuate if the other is burned out.

I claim:

An electrically heated steering wheel of the type described comprising an annular metal rim, said rim being hollow, thus forming an endless passage therethrough, a spider for supporting said rim upon the steering column, a replaceable heating element disposed within said hollow rim and secured to each end against movement relative to the rim, whereby the current conducting portion of said element may be positively held out of engagement with the interior side walls of the rim, and means for conducting current to said heating element, whereby said element when in operation may heat the entire space within said rim, and thereby conduct heat through the metal walls of the rim to the hands of the person holding the rim.

WILLIAM D. SCHWENK.